United States Patent
Alam et al.

(10) Patent No.: US 7,519,864 B2
(45) Date of Patent: Apr. 14, 2009

(54) AUTOMATION TEST SYSTEMS

(75) Inventors: Mohammed Didarul Alam, Plano, TX (US); Alexander Grabovsky, Dallas, TX (US); Sergiy Glushchak, Dallas, TX (US); Serge Spraiter, Dallas, TX (US); Nachiket Acharya, Plano, TX (US); Madhu Gottumukkala, Plano, TX (US); Maxim Ostrooukhov, Richardson, TX (US); Neeraj Tomar, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 11/288,924

(22) Filed: Nov. 29, 2005
(Under 37 CFR 1.47)

(65) Prior Publication Data
US 2007/0168745 A1    Jul. 19, 2007

(51) Int. Cl.
*G06F 11/00* (2006.01)

(52) U.S. Cl. .............................. 714/32; 714/31; 714/38

(58) Field of Classification Search ................... 714/31, 714/32, 38
See application file for complete search history.

(56) References Cited

U.S. PATENT DOCUMENTS

| 2003/0208288 | A1* | 11/2003 | Louden et al. | 700/39 |
| 2005/0204343 | A1* | 9/2005 | Kisamore et al. | 717/124 |
| 2007/0092069 | A1* | 4/2007 | Royzen et al. | 379/27.04 |

\* cited by examiner

*Primary Examiner*—Robert Beausoliel
*Assistant Examiner*—Charles Ehne

(57) ABSTRACT

An automated testing system is provided that includes a computer system, a handset, script and scripting interface, a test module, and a data comparison component. The handset has at least one application resident thereon to be tested. The handset is coupled to communicate with the computer system. The script executes on the computer system and is operable to generate an input to the application on the handset to test the application. The test module is embedded in a source code of the application. The test module is operable to monitor a response by the application to the input by the script. The data comparison component compares the response by the application monitored by the test module to an expected response.

20 Claims, 2 Drawing Sheets

AUTOMATION TEST SYSTEMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to mobile telephony. More specifically, but not by way of limitation, a system and method are provided that allow automated testing of the applications on a mobile telecommunications device.

BACKGROUND OF THE INVENTION

Mobile telecommunications devices, such as digital cellular phones or personal digital assistants, that can be used by a subscriber to a mobile telephony service to place and receive calls via the mobile telephony service can be referred to as handsets. Handsets typically feature a set of applications that can provide various functions such as web browsing, video conferencing, gaming, instant messaging, and others. It is typically desirable to test the applications before offering the handsets for sale to ensure that the applications function properly.

SUMMARY OF THE INVENTION

In one embodiment, a system for automated testing of an application on a handset is provided. The system includes a script operable to generate an input to the application on the handset to test the application. The system includes a test module embedded in a source code of the application. The test module is operable to monitor a response by the application to the input by the script. The system also includes a data comparison component to compare the response by the application monitored by the test module to an expected response.

In one embodiment, an automated testing system is provided that includes a computer system, a handset, a script, a test module, and a data comparison component. The handset has at least one application resident thereon to be tested. The handset is coupled to communicate with the computer system. The script executes on the computer system and is operable to generate an input to the application on the handset to test the application. The test module is embedded in a source code of the application. The test module is operable to monitor a response by the application to the input by the script. The data comparison component compares the response by the application monitored by the test module to an expected response.

In another embodiment, a method for conducting an automated test of an application on a handset is provided. The method includes embedding a test module in a source code of the application, and executing a script simulating user input to the application. The method includes the application performing an action in response to the input, and the test module receiving data related to the application response to the input. The method also includes comparing the received data to an expected result of the input.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Under previous methods for testing the applications on a handset, human testers might manually attempt to perform the various functions provided by the applications. For example, for a phone book application, a tester might attempt to enter, retrieve, and edit names and phone numbers, automatically dial a selected number, and perform other tests of the phone book functionality. For an instant messaging application, a tester might attempt to create, edit, and send an instant message, retrieve and edit names from a buddy list, and carry out other actions related to instant messaging. Other appropriate tests might be manually conducted for other applications. A tester might observe the results of a test and make a subjective judgment regarding the success or failure of the test.

A handset might have a large number of applications and each of the applications might have a large number of functions that need to be tested. Each application may need to be retested on each new handset. Manual testing of all possible functions of all applications on a handset can be labor-intensive, time-consuming, tedious, and error prone. In addition, certain tests, such as stress and stability tests, cannot feasibly be carried out manually. A stress test might require that the same function be performed repeatedly at a rapid pace over a long period of time. It may be unreasonable to expect a human tester to conduct such a test.

In an embodiment of the present disclosure, a system for automated testing of the applications on a handset is provided. The handset communicates with a computer via a data transfer means such as a USB cable. The computer simulates the inputs that a human tester might enter into the handset. Programming code embedded in the source code for the applications receives the responses of the applications to the inputs and sends the responses to the computer. The computer then compares the received responses to the expected responses to determine if the applications are behaving as expected.

Figure 1:
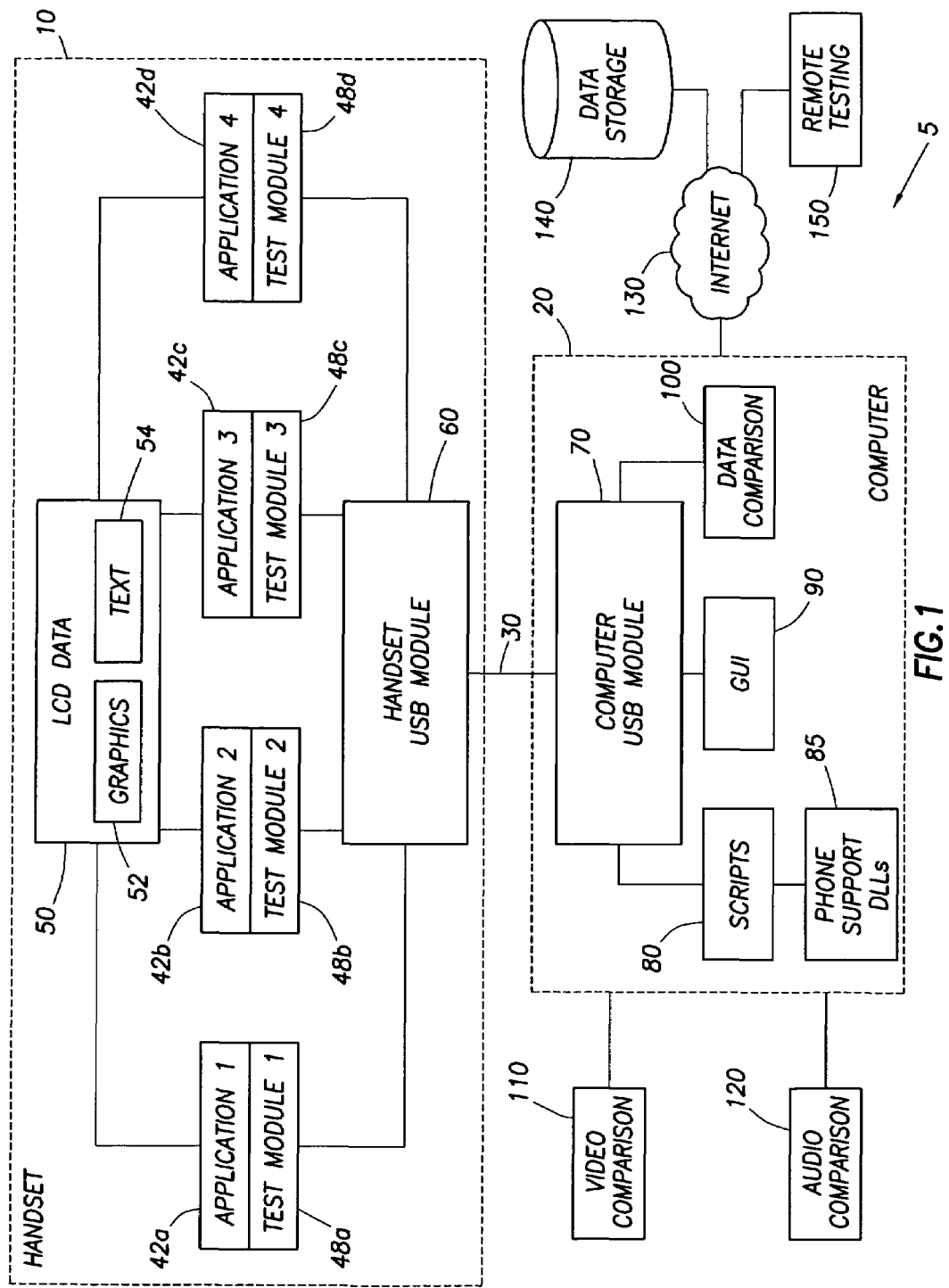
FIG. 1 illustrates a system for automated testing of handsets according to an embodiment of the present disclosure.

FIG. 1 illustrates an embodiment of a system 5 for automated testing of the applications on a handset. A handset 10 is coupled to a computer 20 through a USB cable 30. In other embodiments, other means of communication between the handset 10 and the computer 20 could be used. A plurality of applications 42, including a first application 42a, a second application 42b, a third application 42c, and a fourth application 42d, are installed on the handset 10. In other embodiments, other numbers of applications might be present. The applications 42 might include a Java module, a Brew module, a wireless application protocol (WAP) module, a short message service (SMS) module, a multimedia messaging service (MMS) module, a phone book module, or any other application typically installed or anticipated to be installed on a handset 10.

Testing-related computer code, which can be referred to as a test module 48, promotes test functionality and is embedded in the source code for each of the applications 42. The source code for an application 42 to be tested would typically be available to the enterprise that is conducting the testing. The lines of code that make up a test module 48 can be interspersed at appropriate locations within the lines of the application 42 source code to receive and report on data that is being passed by the application 42 and monitor the activity of the application 42. For example, if a keystroke on the keypad of a handset 10 causes an application 42 to generate a particular data element, one or more lines of test module 48 testing-related code might be placed in the application 42 source code at the point where that data element is generated in order to obtain or monitor the data element. The testing-related code at that point can then send the received data element to the computer 20 for analysis, as described below. Testing-related code can be positioned throughout the source code in this manner so that any of the activities or data generated at any point in the execution of an application 42 can be monitored and/or collected and transmitted to the computer 20.

The test modules 48 may be customized for each application 42. That is, test module 48a may include test code designed to interact with application 42a, test module 48b may include test code designed to interact with application 42b, test module 48c may include test code designed to interact with application 42c, and test module 48d may include test code designed to interact with application 42d. When an application 42 creates an output, such as sending graphical or text data to the display screen on the handset 10, sending voice or video data to another handset, or sending data from one object to another within an application 42, the test module 48 associated with the application 42 can monitor activity or receive the output and send the appropriate or desired information to the computer 20 for analysis.

Data sent to the display screen on the handset 10 can be referred to as LCD data 50. The LCD data 50 might include graphical data 52 and text data 54. Graphical data 52 might include pixel-related information used for creating graphical images on the handset display. Applications 42 might send the graphical data 52 to a video buffer for display on the handset 10 and the test modules 48 might retrieve the graphical data 52 from the video buffer. Text data 54 might include the content of text messages and other information displayed on the handset screen in ordinary written language. The test modules 48 might retrieve the test data 54 directly from the applications 42.

LCD data 50 retrieved by the test modules 48 is sent to a handset USB module 60. The handset USB module 60 is a software interface capable of receiving the LCD data 50 from the test modules 48 and sending the LCD data 50, via the USB cable 30, to a computer USB module 70 on the computer 20. The handset USB module 60 is also capable of receiving the data from the computer USB module 70 and sending the data to the test modules 48.

The computer USB module 70 is a software interface capable of receiving the data from the handset USB module 60 and sending the data to the other components within the computer 20. The computer USB module 70 is also capable of sending data, via the USB cable 30, to the handset USB module 60. In addition to the computer USB module 70, other components in the computer 20 can include a set of scripts 80, a graphical user interface (GUI) 90, and a data comparison module 100.

The scripts 80 carry out the tests that are performed on the applications 42. A script 80 can send an instruction, via the computer USB module 70, the USB cable 30, and the handset USB module 60, to an application 42 to be tested. The instruction can inform the application 42 to perform a specified action. For example, the script 80 might request a web browser to display a specified web page, might request that a specified name be retrieved from a phone book application, might request that an instant message with a specified text be sent, or might cause any other action typically carried out by the applications 42 on a handset 10. The scripts 80 can simulate a user input into the handset 10, such as the pressing of a key on a keypad, the selection of an icon, or the selection of a menu item. The operating system of the handset 10 can receive and process the simulated input in the same manner that it would receive and process the equivalent actual user input.

When the application 42 performs the requested action, data is typically generated. For example, graphical and text data associated with a web page might be retrieved and displayed on the handset screen, a name might be retrieved from a phone book and displayed on the handset screen, or an instant message with the specified text might be prepared and displayed on the handset screen. The test module 48 associated with the application 42 can obtain the data that is generated by the requested action and send the data to the handset USB module 60. The handset USB module 60 can then send the data to the computer USB module 70, which can send the data to the script 80 and/or the data comparison component 100 for analysis, as described below.

A set of scripts 80 can be developed that will cause any desired action to occur in any application 42 on the handset 10 and execution of the scripts 80 can test any functionality of any application 42. While different types of tests are typically performed on different types of applications 42, some commonalities may exist among the different tests. To facilitate the development and modification of the scripts 80, a set of dynamic linked library files (DLLs) 85 can be used to provide functions that are common among the tests. Each script 80 can be customized as needed to perform tasks that differ for different applications 42 and different types of handsets 10 and can call the DLLs 85 as needed to perform tasks that are the same for different applications 42 and different types of handsets 10.

The test modules 48 can be considered fixed hooks or primitives that are embedded in the source code of an application 42 and that are capable of recording the values of variables or actions of the application 42 at various points in the execution of the application 42. The scripts 80 can be considered modifiable input simulators that interact with the primitives to elicit a particular action within an application 42. For example, the scripts 80 might simulate a series of keystrokes used to enter data into an application 42. The primitives receive or may report on any activity or data the application 42 generates in response to the keystrokes and transmit the data or other information to the computer 20. The primitives are designed to interact in a standard manner with any type of script 80 and thus are typically not modified after being embedded in an application 42. The scripts 80 can be modified as needed to perform any type of test on any type of application 42 on any type of handset 10.

While the term 'script' has been used herein to refer to the entity that causes a desired action to occur in an application 42, it should be understood that a program written in a high-level programming language or some other type of software could be used to request an action in an application 42. The term 'script' as used herein can refer to any such software or set of instructions.

The GUI 90 presents an interface that allows a user to begin execution of a script 80 and observe the results of a test. The GUI 90 might contain mechanisms that allow the user to execute all available scripts 80 or to choose to execute only selected scripts 80. The GUI 90 might present descriptions of the actions taken by a script 80 to assist the user in selecting the scripts 80 to be executed. The GUI 90 might also contain mechanisms that allow the user to select the order in which the scripts 80 are to be executed. A mechanism may also be present in the GUI 90 to save a selected set of scripts 80 and the user-specified order in which they are to be executed as part of a test plan for subsequent execution. In addition, the GUI 90 might display the results of a test, including whether an application 42 passed or failed the test and, in the case of a failure, the step in the application 42 where the failure occurred.

The data comparison module 100 is capable of analyzing the data received from the handset 10. That is, the data comparison module 100 compares the data generated as the result of a test with the data that was expected to be generated. Generally, if the generated data and the expected data match, the test is considered a success and if the generated data and the expected data do not match, the test is considered a failure.

The data comparison can be carried out in several different manners. In the case of graphical data 52, the data comparison module 100 might make a pixel-by-pixel comparison of the screen that the application 42 displays in response to a request from a script 80 to the screen that is expected to be displayed. That is, the data that specifies the color and other parameters of a pixel that appears on the screen is compared to the data related to the pixel that is expected to appear at that location. As mentioned above, the pixel data might be retrieved from the video buffer of the handset 10. If any pixel in the displayed screen is different from the expected screen, the test can be considered a failure. The entire screen of the handset 10 can be compared to the expected screen or a script 80 can be written that causes only a portion of the screen to be compared.

In the case of text data 54, the data comparison module 100 might make a character by character comparison of the text displayed on the screen of the handset 10 to the text that is expected to be displayed. If any character in the displayed text is different from the expected character, the test can be considered a failure. A comparison of text data 54 is typically performed when only the content, and not the appearance, of the data is relevant to the test.

In some cases, a test of an application 42 might involve data other than static LCD data 50. For example, a handset 10 might have applications 42 that play back audio or video data. For such an application 42, a script 80 could be written to request the application 42 to play the audio or video data. A test module 48 could be embedded in the application 42 to receive the audio or video data and send the data to the computer 20. In an embodiment, the comparison of the data received by the computer 20 to the data expected to be received is performed by the data comparison component 100.

In an alternative embodiment, a device outside the computer 20 performs the comparison. For example, in the case of video data, a video comparison module 110 can make a frame-by-frame comparison between the video data played by the application 42 and the video data expected to be played. In one embodiment, every frame in a video clip is compared to the expected frame. In another embodiment, only selected frames are compared.

In the case of audio data, an audio comparison module 120 can compare the audio data played by the application 42 with the audio data expected to be played. A microphone can record the audio data played by the application 42 and the recording can be input into the audio comparison module 120. The audio comparison module 120 might be an oscilloscope or similar device that is capable of analyzing the waveforms of the audio signals and comparing the recorded input with the expected audio data.

The data used for comparison with the data that is sent by the handset 10 to the computer 20 upon a request by a script 80 can come from various sources. In the case of LCD data 50, the developers of the applications 42 would typically provide comparison data that demonstrates the appearance that the applications 42 are intended to generate. In the case of video or audio data, the comparison data might be provided by a third-party vendor. For example, a vendor that intends for a video clip to be played when its application 42 starts up might provide the video clip for comparison. If a script 80 causes the video clip to be played on the handset 10, the clip played on the handset 10 could be compared to the clip provided by the vendor. In either case, the comparison data might be stored directly on the computer 20 or on another storage device accessible to the computer 20 so that the comparison data is available as needed to the data comparison component 100, the video comparison component 110, and/or the audio comparison component 120.

As mentioned above in some embodiments, the test modules 48 may be implemented for specific systems, protocols, platforms, and so on such as a Java module, a Brew module, a wireless application protocol (WAP) module, a short message service (SMS) module, a multimedia messaging service (MMS) module, a phone book module, or modules for testing any other application or system typically installed, present or anticipated to be on the handset 10. A Java module and/or Brew module can refer test modules 48 specifically for testing applications written in or for the specified platform and any associated software needed to execute the applications. For example, the Java module might be customized to accommodate or promote testing of Java-based applications, Java Runtime Engines, and any other Java related software. Similarly the WAP, SMS, and MMS modules may be operable for communicating with these messaging systems and protocols to promote testing of related applications or systems. Further, these modules may contain reusable components that can be utilized to test different applications or systems.

The results of the tests performed by the automated testing system 5 can be displayed in the GUI 90. That is, for each script 80 that is executed, an indication can appear in the GUI 90 specifying whether the test associated with the script 80 passed or failed. The results might be stored on the computer 20 or on a remote storage device 140. If the remote storage device 140 is accessible via the Internet 130, results of the tests might be available to users without direct access to the computer 20.

In an embodiment, users without direct access to the computer 20 may be capable of initiating tests on the applications 42 on a handset 10 via the Internet 130. A remote testing component 150 might contain a GUI similar to the GUI 90 that appears on the computer 20. A user might connect to the computer 20 via the Internet 130 and, by means of the GUI on the remote testing component 150, might be able to initiate tests in a similar manner to a user with direct access to the computer 20. In such a case, a user with direct access to the computer 20 would need to physically connect the handset 10 to the computer 20 via the USB cable 30 prior to testing by the user of the remote testing component 150.

Different scripts 80 are typically executed for different models of handsets 10. In one embodiment, a user might manually enter into the GUI 90 information about the handset model to be tested. The GUI might then display only the scripts 80 that are appropriate for that model. In an alternative embodiment, when a handset 10 is connected to the computer 20, the computer 20 is capable of automatically detecting the model of handset 10 that has been connected and can make the appropriate adjustments to test the applications 42 based on the model and operating system of the handset 10.

Figure 2:
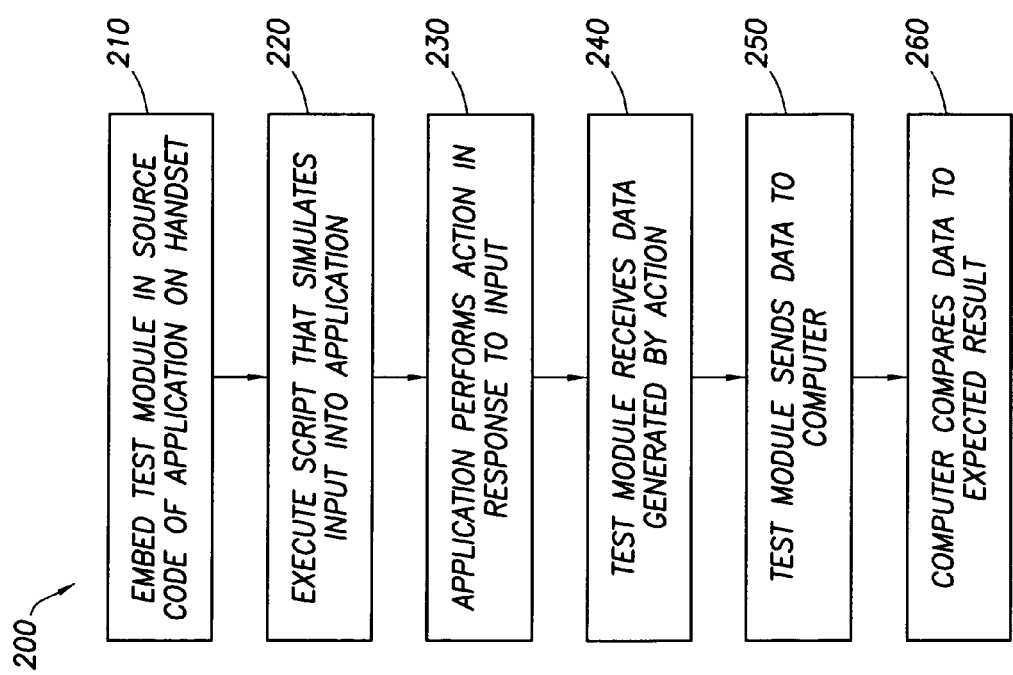
FIG. 2 illustrates a method for automated testing of handsets according to an embodiment of the present disclosure and illustrates the process of applying test automation.

FIG. 2 illustrates a method 200 for automated testing of applications on a handset. In box 210, a test module is embedded in the source code of an application on a handset. In box 220, a script is executed that simulates an input into an application on the handset. The script might be sent from a computer to the handset over a USB connection. In box 230, the application performs an action in response to the input. In box 240, the test module receives data generated by the action or monitors the resulting activity. The test module sends the received data or other information on the monitored activity to a computer in box 250. The received data might be sent over the USB connection. In box 260, the computer compares the received data or activity to an expected result. The computer might then display and/or store the results of the comparison.

In an alternative embodiment, automated testing of a handset can be conducted in a geographic location where the wireless communication protocol followed by the handset is not generally in use. Some countries or geographical areas might use the CDMA (Code Division Multiple Access) wireless technology, others might use the GSM (Global System for Mobile communication) wireless technology, others might use the TDMA (Time Division Multiple Access) wireless technology, and others might use still other technologies. These technologies are not necessarily compatible with one another. That is, a handset designed for operation with one of the technologies may not function in a region where a different protocol is used.

Under the prior art, if testing needed to be conducted on a GSM-based handset, for example, in a region where the CDMA protocol, for example, is used, a tester might need to travel to a region where the GSM protocol is used and perform the testing in that location. Physically relocating the testers and the handsets to a different region, possibly an overseas country, can be expensive and inconvenient.

Figure 3:
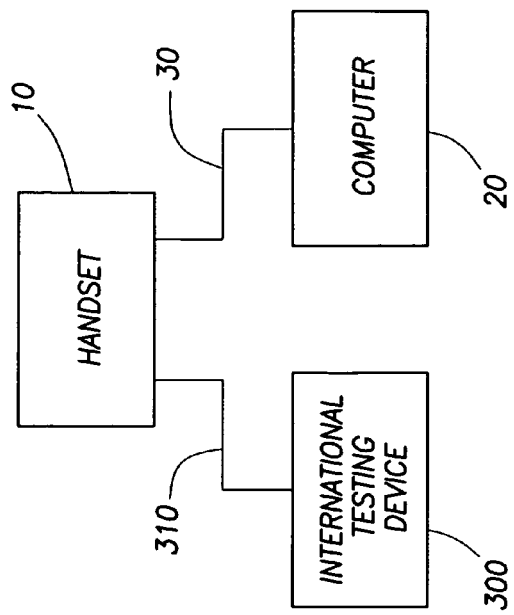
FIG. 3 illustrates a system for automated testing of handsets according to an alternative embodiment of the present disclosure, and further illustrates the configuration for supporting international market devices.

Under the current embodiments, a network simulation device, such as the Agilent 8960, can be coupled to a handset to simulate a wireless communication environment. Automated testing as described above can then be conducted on the device as if the device were physically present in a region where the simulated wireless communication protocol is in use. Such an embodiment is illustrated in FIG. 3. A handset 10 is coupled to a computer 20 via a USB cable 30 as described above. Applications on the handset 10 have embedded test modules as described above and the computer 20 is capable of executing scripts as described above.

The handset 10 is also coupled to an international testing device 300 such as the Agilent 8960. In other embodiments, other brands or models of network simulation devices could be used. Communication between the handset 10 and the international testing device 300 takes place via an RF probe 310. The RF signals that are typically sent and received over the air by an antenna on the handset 10 are instead generated by and received by the international testing device 300 via the RF probe 310. The international testing device 300 and the RF probe 310 can thus create an interface to the handset 10 that simulates any desired wireless communication environment.

When the international testing device 300 and the RF probe 310 are coupled to the handset 10, automated testing as described above can be conducted in a location where the wireless communication protocol followed by the handset 10 is not generally in use. For example, if the handset 10 uses CDMA-based technology but testing is to be conducted in an area where GSM is the prevalent protocol, the international testing device 300 can be set to simulate a CDMA environment. Scripts on the computer 20 can then cause specified actions to occur in an application on the handset 10 and test modules on the handset 10 can return data generated by the application to the computer 20 for analysis. If the application involved the sending or receiving of RF signals, the handset 10 would be able to send or receive the signals as if it were physically present in a CDMA environment. The international test device 300 may also include an SMS/MMS Gateway as an integrated or separate component.

The automated testing of the applications on a handset provides features that may be unavailable or infeasible when the testing is conducted by humans. For example, stress and stability testing can be faster and more accurate, thorough, reliable, and cost effective with automated testing than with tests performed manually. A stress test might require that an input be made into an application rapidly and repeatedly. The input can be made electronically by the present system at a much faster rate and for a much longer time than might be possible by a human making manual entries. A human tester may be prone to tedium and errors when performing such tests. Once an automated testing system is in place, little further expense is needed to conduct tests. Human testers, on the other hand, can incur significant expenses every time a test is run.

Also, automated tests can perform tasks that humans may not be capable of performing. For example, a pixel-by-pixel analysis of a handset display might detect errors that might go unnoticed by or might be undetectable to the human eye. Similarly, a human analysis of audio data might require a subjective judgment regarding the quality of the sound, but an automated analysis of the audio data can provide a highly accurate, objective assessment of sound quality.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for automated testing of an application on a handset comprising:
    a script operable to generate an input to the application on the handset to test the application;
    a test module embedded in a source code of the application, the test module operable to monitor a response by the application to the input by the script; and
    a data comparison component operable to compare the response by the application monitored by the test module to an expected response,
    wherein the system is operable to automatically determine a type of the handset and execute the script in response to the type of the handset.

2. The system of claim 1, wherein the input generated by the script is further defined as input simulating user handset keypad input.

3. The system of claim 1, where the response is further defined as an application data and wherein the expected response is further defined as an expected data element.

4. The system of claim 1 wherein the application data and the expected data are at least one of:
    a pixel-related data;
    a text data;
    a video data; and
    an audio data.

5. The system of claim 1, further comprising:
    a computer system whereon the script executes;
    a handset USB module operable on the handset; and
    a computer USB module operable on the computer system, the handset USB module operable to communicate with the test module, the computer USB module operable to communicate with the data comparison component, and the handset USB module and the computer USB module further operable to communicate with one another via a USB cable.

6. The system of claim 1, further comprising a remote testing component operable to promote testing of the handset application via the computer system from a location remote to the computer system.

7. A method for conducting an automated test of an application on a handset comprising:
    embedding a test module in a source code of the application;
    determining a type of the handset;
    based upon the type of the handset, executing a script simulating user input to the application;
    the application performing an action in response to the input;
    the test module receiving data related to the application response to the input; and
    the comparing the received data to an expected result of the input.

8. The method of claim 7, further comprising:
    coupling a handset USB module to the handset;
    coupling a computer USB module to a computer whereon the script executes;
    the handset USB module communicating with the test module;
    the computer USB module communicating with a data comparison component on the computer; and
    the handset USB module and the computer USB module communicating with one another via a USB cable.

9. The method of claim 8, further comprising displaying on a graphical user interface of a display of the computer a result of the comparison of the received data to the expected result.

10. The method of claim 9, further comprising selecting one or more of the scripts to execute to test the application on the handset.

11. The method of claim 10, further comprising a remote testing component interacting with the graphical user interface via a network coupled to the computer and the remote testing component.

12. The method of claim 7, wherein the received data is further defined as video displayed to a display of the handset and where the expected result is the video data to be displayed on the handset display, the method further comprises conducting a frame-by-frame comparison of the video data to the displayed data.

13. The method of claim 7, wherein the received data is further defined as audio played on a speaker of the handset and where the expected result is an expected sound of the audio to be played on the handset speaker, the method further comprises comparing the expected sound to the sound produced by the speaker of the handset.

14. The method of claim 8, further comprising:
    coupling the handset to the computer for testing; and
    automatically determining a type of the handset that has been coupled to the computer.

15. An automated testing system, comprising:
    a computer system;
    a handset having at least one application resident thereon to be tested, the handset coupled to the computer system;
    a script executable on the computer system and operable to generate an input to the application on the handset to test the application;
    a test module embedded in a source code of the application, the test module operable to monitor a response by the application to the input by the script; and
    a data comparison component operable to compare the response by the application monitored by the test module to an expected response,
    wherein the computer system is operable to automatically determine a type of the handset that has been coupled to the computer system and execute the script based upon the type of the handset.

16. The automated testing system of claim 15, wherein the handset is further defined as a mobile telephone handset.

17. The automated testing system of claim 15, further comprising a program operable to organize and launch a series of scripts to automatically test a plurality of applications on the handset.

18. The automated testing system of claim 17, wherein the script is operable to generate input simulating user handset keypad input and wherein the test module is operable to monitor the application response to the simulated input and display the results of the data comparison component to a graphical user interface on the computer system.

19. The automated testing system of claim 17, further comprising a remote component operable to employ at least some of the functionality of the program from a location remote to the computer system and the handset.

20. The automated testing system of claim 15, wherein the computer system communicates with the handset via one of a wireless communication link, a wired communication link, and a Universal Serial Bus link.

* * * * *